United States Patent [19]

Benton et al.

[11] 4,172,067

[45] Oct. 23, 1979

[54] FROTH AID

[75] Inventors: Richard E. Benton, Louisville, Ohio; David P. Gruber, Scotia, N.Y.; Henry G. Schmidt, Akron; Ralph E. Myers, Jr., Uniontown, both of Ohio

[73] Assignee: The General Tire & Rubber Company, Akron, Ohio

[21] Appl. No.: 945,952

[22] Filed: Sep. 25, 1978

[51] Int. Cl.$^2$ ............................................. C08L 13/02
[52] U.S. Cl. .............................. 260/29.7 H; 252/350; 260/29.6 Z; 260/29.7 NQ; 260/29.7 SE
[58] Field of Search ................... 252/350; 260/29.6 Z, 260/29.6 N, 29.6 E, 29.7 H, 29.7 SQ, 29.7 NQ, 29.7 SE, 29.7 N, 29.7 NE, 29.7 E

[56] References Cited

U.S. PATENT DOCUMENTS

| | | | |
|---|---|---|---|
| 3,491,033 | 1/1970 | Dunn | 260/2.5 |
| 3,650,995 | 3/1972 | Erickson | 260/29.7 H |
| 3,823,104 | 7/1974 | Bondy | 260/2.56 |
| 4,014,843 | 3/1977 | Xanthopoulo | 260/29.6 SE |
| 4,098,944 | 7/1978 | Pollock | 260/29.7 H |
| 4,099,913 | 7/1978 | Walter | 8/166 |

*Primary Examiner*—Paul R. Michl

[57] ABSTRACT

A froth-aid useful in frothing a carboxylated latex for use as an adhesive in the manufacture of carpets comprises in certain proportions urea, the sodium salt of condensed naphthalene sulfonic acid, a blend of about $C_8$ to $C_{18}$ fatty alcohols, ammonium or sodium lauryl sulfate and water.

4 Claims, No Drawings

FROTH AID

This invention relates to a froth aid for use in frothing a carboxylated latex used as an adhesive in the manufacture of carpets and upholstery.

Carboxylated latices are used as adhesives in securing the primary as well as the secondary backing to the tufts of the carpet to form a unitary structure on drying and curing. Frothing is desirable as it reduces the amount of latex required to give the desired adhesion and helps to prevent strike through of the lamination by the latex. After the latex has been frothed, it is crushed or collapsed during the carpet backing process since the froth or cells do not contribute to adhesion of the backing(s) to the tufts of the carpet.

Accordingly, an object of this invention is to provide a composition of matter useful as a froth aid for a carboxylated latex especially one for use as an adhesive in the manufacture of carpets.

These and other objects and advantages of the present invention will become more apparent to those skilled in the art from the following detailed description and working example.

DISCUSSION OF THE PRIOR ART

U.S. Pat. No. 3,491,033 discloses a method for making a foam without using a gelling agent. To a latex is added a large amount of a foaming agent; the latex is wipped to form a foam; the foam is progressively dried to form a solid cellular dry foam from the wet foam; and the dry foam is finally cured. Many polymers are suggested including those with carboxylic acid moities. The foaming agent can be anionic, cationic or nonionic, and among the many agents disclosed are sodium lauryl sulfate and aliphatic alcohols having from 10 to 16 carbon atoms (but not mixtures of alcohols). A working example using alcohol as a foaming agent is not shown. It is stated that urea is one of many crosslinking agents that can be used with the copolymer but is not disclosed as a foaming agent. The sodium salt of condensed naphthalene sulfonic acid is not disclosed. A process for carpet backing is not disclosed.

U.S. Pat. No. 3,823,104 discloses that wet foams can be stabilized and dried to form solid foams. The stabilizer (0.5 to 7.5% or 1 to 3% by weight) is a blend selected from the group of saturated or unsaturated fatty alcohols and fatty acid amides and mixtures thereof. The alcohols have from 8-20 carbon atoms. It is stated in column 2, lines 24 to 28, that certain higher members especially those having alkyl groups ($C_{10}$-$C_{18}$) do not function by themselves effectively as foam stabilizers. Polymers to be used can be formed from various monomers such as butadiene, styrene, and those containing carboxylic acid groups. Urea, ammonium or sodium lauryl sulfate and the sodium salt of condensed naphthalene sulfonic acid are not disclosed. A process for carpet backing is not disclosed.

U.S. Pat. No. 4,099,913 ("Official Gazette," July 11, 1978, pages 671 and 672) discloses a froth composition containing 5-75 weight % of a functional textile treating compound, 0.2-5 weight % of frothing agent, 0-5 weight % of a wetting agent and the balance water. It is stated that the foam is characterized in that it immediately breaks on contact with the substrate and is rapidly absorbed thereby to leave the surface thereof essentially dry to the touch.

SUMMARY OF THE INVENTION

A froth aid for addition to a carboxylated latex adhesive to form a froth on whipping and the like useful in carpet backing processes comprises in the following proportions (1) from about 7 to 26 parts by weight of urea, (2) from about 1.5 to 2.5 parts by weight of the sodium salt of condensed naphthalene sulfonic acid, (3) from about 7.5 to 13 parts by weight of mixed about $C_8$ to $C_{18}$ fatty alcohols, (4) from about 7.5 to 13 parts by weight of ammonium or sodium lauryl sulfate or mixture thereof and (5) from about 35 to 55 parts by weight of water. On a dry weight bases the froth-aid is used in an amount of about 1.0 to 4 parts by weight per 100 parts by weight of the carboxylated copolymer or polymer mixture of the latex composition. The froth aid produces a stable froth without losing adhesive properties. The frothed carboxylated latex composition exhibits high froth viscosity as compared to the same unfrothed compound viscosity and high yield values as determined by Brookfield viscometer. The resulting froth exhibits high ride penetration to lock the tufts. Additionally, the froth aid provides fine uniform air bubbles when the latex, also compounded with filler, is passed through a frothing machine such as the Texi Cote or the Oakes machine and stabilizes the air entrapment. This resistance to the dissipation of air within the laminating compound is desirable in order to inhibit migration of latex binder into the carpet substrate. Binder migration results in heavier coating weights and lower adhesion values as the binder (adhesive) at the carpet/secondary jute interface is diminished.

DISCUSSION OF DETAILS AND PREFERRED EMBODIMENTS

The froth aid composition is defined as set forth in the foregoing paragraph. To obtain the best mixture or blend the urea should be mixed with the sodium salt of condensed naphthalene sulfonic acid until components are at least partially dissolved followed by the alcohol mixture and finally the ammonium or sodium lauryl sulfate. Some or all of the ingredients preferably may first be dissolved or dispersed in the water. Mixing can be conducted at room temperature (about 25° C.) up to about 40°-50° C. Use of sodium xylene sulfonate instead of the sodium salt of condensed naphthalene sulfonic acid did not give satisfactory results. Also, the use of sodium polyacrylate did not give a satisfactory frothing aid. When simple alcohols were substituted for the blend of alcohols, the desired results were not obtained. Likewise, the adduct of 3 mols of ethylene oxide and the blend of alcohols did not give satisfactory results. The froth aid exhibits some thixotropic properties but can be stirred or pumped especially when heated. If some phase separation of materials of the froth-aid occurs on storage, the material may be readily stirred to again give a homogeneous appearing composition. If viscosity is too great, about 2-4% by weight of isopropyl alcohol based on the weight of the froth aid may be added to reduce viscosity. High viscosity may be caused by failure to follow the preferred order of adding or mixing the ingredients as shown above. In place of isopropanol a surfactant such as "Aerosol" 18 (American Cyanamid Company) may be added. While the froth aid can be diluted with water, this requires changes in the latex component such as increased concentration of polymer in the latex, more filler and so forth and may be disadvantageous.

The froth aid composition of the present invention is not only useful in making carpets with only a primary backing but also with those containing a secondary backing.

While the composition of the present invention can be used in adhesives applied to the back of any woven or nonwoven carpet (or rug) material to secure the base yarns to the other yarns of the carpet such as Wilton, Axminster, knitted and other carpets, as well as to a secondary backing, it is particularly useful in the manufacture of piled or tufted carpets. In piled or tufted carpets the fibers or yarn is needled or looped through the interstices or holes in a square woven or nonwoven primary cloth such as cotton, polypropylene, jute or other primary backing material. The primary backing material can be square woven jute although other natural or synthetic fibrous material or mixture thereof can be used. For a thorough discussion of the manufacture of carpets and especially tufted carpets please see "Carpets And Other Textile Floor Coverings," Robinson, 2nd Ed., 1972, Textile Book Service, Division of Bonn Industries Inc., The Trinity Press, London. Please, also, see "Wellington Sears Handbook of Industrial Textiles," Kaswell, 1963, Wellington Sears Co., Inc., New York.

The yarns or tufts of the carpet can be natural or synthetic organic fibers or mixture thereof. Additionally, the yarns may vary from one type to another type. Examples of such yarns are those from silk, cotton, wool, hair, nylon, acrylics ("Acrilan"), polyester, polyvinyl chloride, vinyl chloride-vinyl acetate copolymers, polyurethanes, rayon, polyacrylonitriles, vinyl chloride or vinylidene chloride copolymerized with acrylonitrile, polyvinylidene chloride, polypropylene fibers and the like. Glass fibers may be blended or woven with the natural and/or synthetic organic fibers. These fibers or yarns can contain fire retardants, antistatic agents, bacteriostats, antidegradants, dyes, pigments, optical brighteners, and so forth.

The adhesive used for practice of the present invention is an aqueous emulsion of a flexible crosslinkable-COOH containing polymer or mixtures of such polymers. Examples of such polymers are the copolymers of butadiene, piperylene, isoprene, 2,3-dimethyl butadiene-1,3 and other dienes of 4 to 6 carbon atoms with a copolymerizable unsaturated acid such as acrylic acid, methacrylic acid, ethacrylic acid, sorbic acid, maleic acid, fumaric acid, itaconic acid, vinyl benzoic acid, $\alpha$-chloro acrylic acid, crotonic acid, citraconic acid, and the like and mixtures thereof. There, also, may be copolymerized with the diene and acid monomer one or more other copolymerizable monomers such as styrene, $\alpha$-methyl styrene, vinyl toluene, acrylonitrile, methacrylonitrile, methylacrylate, ethylacrylate, butyl acrylate, ethyl hexylacrylate, methyl methacrylate, hydroxy ethyl acrylate, hydroxy ethyl methacrylate, acrylamide, methacrylamide, and the like and mixture thereof. Still other polymers can be used such as the copolymers of one or more of the above acrylates and one or more of the above acrylic acids. The addition of the third, fourth, etc. monomer will be determined by the need for compatibility with the carpet materials, stiffness, and the toughness, strength, water and solvent resistance and so forth desired. Preferred copolymers to use are the aqueous emulsions of flexible carboxylated butadiene copolymers, e.g., copolymers of butadiene plus styrene and/or acrylonitrile and at least one acid selected from the group consisting of acrylic, methacrylic, fumaric, maleic, and itaconic acids. These copolymers may be prepared in aqueous emulsion systems using conventional emulsifiers, chain transfer agents, antioxidants, short-stop agents, free-radical catalysts and so forth as well known to the art. Methods for making these polymers are disclosed in U.S. Pat. Nos. 2,604,668; 2,669,550; 2,710,292; 2,724,707; 2,849,426; 2,868,754; 3,392,048; 3,404,116; 3,409,569; and 3,468,833. Please, also, see "Rubber World," September, 1954, pages 784 to 788 and "Industrial and Engineering Chemistry," May, 1955, pages 1006 to 1012. The aqueous adhesive can have a solids content of from about 30 to 60%, have a pH of about 7.5 to 11.5 and have a Brookfield viscosity of about 50–350 (LVF Model #2 Spindle @ 60 rpm) cps at 25° C. While an ester of the acid or the acid anhydride and so forth can be copolymerized instead of the acid and then hydrolyzed and neutralized to form acid groups or salt groups in the copolymer, this procedure is not as convenient as directly polymerizing the acidic monomer with the other copolymerizable monomer(s).

Free-radical aqueous emulsion copolymerization to make random, linear, branched or graft copolymers is well known. They may be of high or low m.w. and may contain gel or little or no gel depending on the degree of polymerization. In this connection reference is made to "Encyclopedia of Polymer Science and Technology," Interscience Publishers a division of John Wiley & Sons, Inc., New York, Vol. 2 (1965) pages 278–295, Vol. 3 (1965) pages 26–29, Vol. 5 (1966) pages 801–859, Vol. 7 (1967) pages 361–431, and Vol. 9 (1968) pages 814–841; Bovey et al, "Emulsion Polymerization," Interscience Publishers, Inc., New York, 1955; Whitby et al, "Synthetic Rubber," John Wiley & Sons, Inc., New York, 1954; Schildknecht, "Vinyl and Related Polymers," John Wiley & Sons, Inc. New York, 1952; "Copolymerization," High Polymers, Vol. XVIII, Ham, pages 323–324, 335–420 and 573, Interscience Publishers a division of John Wiley & Sons, New York, 1964; "Block and Graft Polymers," Burlant and Hoffman, Reinhold Publishing Corporation, New York, 1960; "Block and Graft Copolymers," Ceresa, Butterworth & Co. (Publishers) Ltd., London, 1962; and "Graft Copolymers," Polymer Reviews, Vol. 16, Battaerd and Tregear, Interscience Publishers, a division of John Wiley & Sons, New York, 1967; U.S. Pat. No. 3,914,340; "Latex In Industry," Noble, 2nd Ed., 1953, Rubber Age, Palmerton Publishing Co., New York and "High Polymer Latices," Blackley, 1966, Vols. 1 and 2, Macluren & Sons Ltd., London.

A minor amount by weight (up to about 25% by weight on a dry weight basis) of the carboxylated latex may be replaced with other polymeric emulsions or latices which are compatible with the carboxylated latex, which do not substantially reduce the adhesive capabilities of the carboxylated copolymer for carpet backing purposes, and which do not require excessive surfactant to balance pigment loading. Examples of such latices are those of polybutadiene, polyisoprene, natural rubber, butadienestyrene copolymer, butadiene-acrylonitrile copolymer, butadiene-styrene-acrylonitrile copolymer, butadiene-acrylic ester copolymer, butadiene-styrene-vinyl pyridine copolymer, butadiene-vinyl pyridine copolymer and so forth and mixture thereof. It is understood that carboxylated copolymer herein means the carboxylated polymer and up to 25% thereof of the other polymers as mentioned in this paragraph.

These carboxylated copolymers are readily crosslinked by means of polyvalent metal compounds such as the hydroxides and oxides of zinc, magnesium, calcium, titanium, barium, strontium, cobalt, tin, iron, lead and others. The chloride, sulfate, nitrate, acetate, and formate salts of Ca, Mg, Sn, Fe, Sr, Ni, Zn and Co may also be used as crosslinking agents. Sodium or alkalimetal aluminate is also a crosslinking agent. Polyamines, also, can be used as crosslinking agents such as ethylene diamine, 1,3-diaminobutane, diethylenetriamine, and the like. Other crosslinking agents can be used such as the epoxides, amino-formaldehyde resins, phenol-formaldehyde resins, urea-formaldehyde resins, urea-melamine resins and so forth. Additionally, sulfur curing systems can be used; however, such require extended curing times at elevated temperatures and may not be too desirable. In fact, if a mineral pigment or filler such as limestone, calcium carbonate, is employed, it will furnish sufficient divalent metallic ions during the curing step to provide the necessary crosslinking between the COOH groups of the copolymer. Other divalent metal carbonates may likewise be used. Mixtures of the various curing or crosslinking agents can be used.

In addition to the curing agents the aqueous carboxylated copolymeric adhesive composition can contain the usual antioxidants, dispersing agents, clay, defoamers, other mineral fillers, $TiO_2$, thickeners, fire retardants, bacteriostats, pigments or colorants, surfactants, alumina, alumina hydrate, U-V absorbers, ammonia cut casein, and so forth.

The compounded aqueous adhesive composition can contain as high as about 85% total solids content, and its initial viscosity can vary from about 9,000 to 20,000 or 25,000 cps. It is frothed with air or other gas which is nonreactive under spreading and curing conditions to form a foam containing about 20-75% gas.

Examples of useful adhesives for use in the practice of the present invention comprise (1) 200 parts by weight of an aqueous latex of 50% solids of a flexible copolymer of about 50% or more styrene and the balance a mixture of butadiene-1,3, methacrylic acid and itaconic acid, (2) 80 to 600 parts by weight of ground limestone filler, (3) a minor amount of a polyacrylate thickener and (4) the froth-aid of the present invention. The total solids content of the aqueous adhesive composition can be from about 50 to 85% by weight and can have an initial viscosity of up to about 20,000 to 25,000 cps. This adhesive can be frothed by whipping or using a commercially available foamer such as an Oakes Foamer with air or other inert or nonreactive gas to contain from about 20 to 75% air or gas. Water can be added to the adhesive to change the viscosity as desired. p The compounded aqueous frothed adhesive coating composition can be applied to the back of the carpet by air knife coating, blade coating, brush-finish coating, cast coating, flow-on coating, knife coating, machine coating, polished drum coating, print on coating, roll coating, spray coating, wire wound rod coating or other methods known to the art for coating the backing of a carpet. It can be used not only for carpet primary backing but also for carpet secondary backing.

The secondary backing material or layer can be made of any natural or synthetic fibers or mixtures thereof such as cotton, rayon, nylon, polypropylene, acrylics, hair or bast and so forth and is usually made of square woven fibers. Bast fibers include jute, flax, hemp, sunn, ramie, henaf, urena, nettle and the like. Of these backing materials it is preferred to use jute fibers. Please see "Matthews' Textile Fibers," Mauersberger, 6th Edition, John Wiley & Sons, Inc., New York, 1954, pages 257 to 281. Jute fibers are well known commercially, and sources of the same can readily be found in "The Carpet and Rug Institute Directory and Report," 1974-75, September, 1975, published by the Carpet and Rug Institute, Dalton, Georgia. Prior to the use in the practice of the present invention the jute or other backing fiber can be sized with starch, treated with antidegradants, fire retardants, steam or hot water (U.S. Pat. No. 4,009,310) and so forth.

To review a process where a secondary backing is used, the carpet layer is secured on a tenter (a frame or rack with hooks or clips along two sides used for drying or stretching cloth) or other suitable apparatus and is carried against a roller (pick-up or transfer roll carrying the frothed latex) which coats (about 24 oz. dry wt. per square yard) and impregnates the back of the carpet with the frothed aqueous adhesive composition at ambient temperature. The carpet carrying the frothed latex then passes under a doctor bar and possibly also a stipple roll. Then a layer of the second jute backing is marriage rolled against the back of the carpet containing the adhesive layer, press rolled and held by the tenter frame to prevent separation from the adhesive coated and impregnated back of the carpet and passed through an air oven at a temperature and for a time sufficient to dry the laminate and cure the adhesive, preferably at about 120°-205° C. for about 1 to 30 minutes. This causes evaporation of the water and curing of the polymer to cause it to adhere or bind the secondary backing to the back of the carpet to form a carpet with a secondary backing integrally bonded to the back of the carpet as well as to bind the fibers of the carpet thereto. The passing of the frothed adhesive coated carpet backing under the doctor bar, stipple roll and the marriage roll and the pressing of the secondary backing against the back of the carpet causes collapse of the wet froth and collapse of at least substantially all or all of the cell structure and further penetration of the adhesive into the back of the carpet and into the secondary jute backing so that on drying and curing the ends of the tufts or fibers of the carpeting are locked to its cloth or backing and to the secondary backing. Frothing among other things serves to reduce or prevent strike through. Collapse of the froth (or foam) is necessary since the froth or foam provides weak adhesion.

The temperature during drying and crosslinking of the adhesive should be below that which would adversely affect the properties of the tufts or bulk of the fibers of the carpet by causing loss of strength, melting and so forth.

The following example will serve to illustrate the invention with more particularity to those skilled in the art.

EXAMPLE

Six froth aid compositions were prepared based on the following composition:

| Composition | Parts by Weight |
| --- | --- |
| 50% urea in water | 42.6 |
| Sodium salt of condensed naphthalene sulfonic acid | 2.0 |
| Alcohol Blend[1] | 10.0 |
| 29% sodium lauryl sulfate | 33.4 |

-continued

| Composition | Parts by Weight |
|---|---|
| in water | 30 |

(1)Mixture of fatty alcohols: $C_8$, $C_{10}$, $C_{12}$, $C_{14}$, $C_{16}$ and $C_{18}$ OH + 1.0 max. hydrocarbon, at least 65% $C_{12}$OH, Hydroxyl value 280–290 (CO 1214 fatty alcohol, Proctor & Gamble).

The urea solution was preheated and pumped to a tank and heated to 43.33° C. The sodium salt of condensed naphthalene sulfonic acid was mixed with the urea-water mixture and when it dissolved, the alcohol blend was added. Finally the sodium lauryl sulfate was mixed in the blend and stirring at a low speed continued for a while. The froth aid compositions were then tested and the results are shown below:

| Froth Aid Run No. | ASTM Total Solids (2 hrs. at 105° C.) | ph | Brookfield Viscosities (Centipoises at 32.22° C.) | |
|---|---|---|---|---|
| | | | LVT #4 @ 60 rpm. | RVT #4 @ 50 rpm. |
| 1 | 42.71 | 9.65 | 4370 | 3744 |
| 2 | 43.11 | 9.65 | 2550 | 2720 |
| 3 | 43.11 | 9.65 | 3440 | 2360 |
| 4 | 42.25 | 9.5 | 3300 | 3060 |
| 5 | 39.57 | 9.35 | 3500 | 2908 |
| 6 | 39.02 | 9.55 | 3300 | 2640 |

The froth aids were then evaluated in a carboxylated latex formulation and tested as follows:

| Ingredient | Parts by Weight | | | | | |
|---|---|---|---|---|---|---|
| | A | B | C | D | E | F |
| Latex(1) | 200 | 200 | 200 | 200 | 200 | 200 |
| Froth Aid, Run 1 | 4.8 | | | | | |
| Froth Aid, Run 2 | | 4.8 | | | | |
| Froth Aid, Run 3 | | | 4.8 | | | |
| Froth Aid, Run 4 | | | | 4.8 | | |
| Froth Aid, Run 5 | | | | | 4.8 | |
| Froth Aid, Run 6 | | | | | | 4.8 |
| Calcium Carbonate (Whiting) | 425 | 425 | 425 | 425 | 425 | 425 |
| "Paragum" 141(2) | 2.2 | 2.2 | 2.2 | 2.2 | 2.2 | 2.2 |
| Viscosity Hobart Mixer | 14,200 | 13,800 | 13,800 | 13,600 | 14,100 | 13,700 |
| Froth time (50% air), Secs. | 70 | 70 | 70 | 70 | 70 | 70 |
| Froth viscosity | 22,500 | 24,000 | 23,000 | 21,000 | 23,500 | 23,750 |
| 1 min. yield | 93 | 96 | 95 | 90 | 93 | 95.5 |
| 5 min. yield | 81.5 | 87 | 85 | 74 | 82.5 | 85.5 |

(1)Latex - Aqueous emulsion free-radical polymerized high molecular weight carboxylated butadiene-styrene copolymer containing about 55% by weight of styrene, not over about 5% by weight total of methacrylic and itaconic acids and the balance butadiene-1,3. Polymer Tg of about −20° C., 50% solids, and pH of 9.0. Brookfield viscosity (#2 @ 60 LVF) of 70, and surface tension of 54.0. Contains antioxidant.
(2)Sodium polyacrylate, latex thickener and stabilizer, Para-Chem, Inc.

Similar frothed compositions, applied to the back of a carpet and then a secondary jute backing applied which crushed the froth, exhibited excellent adhesion on drying and curing.

We claim:

1. A composition of matter comprising in the following proportions (1) from about 17 to 26 parts by weight of urea, (2) from about 1.5 to 2.5 parts by weight of the sodium salt of condensed naphthalene sulfonic acid, (3) from about 7.5 to 13 parts by weight of mixed about $C_8$ to $C_{18}$ fatty alcohols, (4) from about 7.5 to 13 parts by weight of ammonium lauryl sulfate or sodium lauryl sulfate or mixture thereof and (5) from about 35 to 55 parts by weight of water.

2. A composition of matter according to claim 1 containing additionally a carboxylated copolymer latex where the ratio, on a dry weight basis, of the copolymer of said latex to the composition of said claim 1 is from about 100:1 to 100:4.

3. A composition of matter according to claim 2 wherein said latex contains a mineral filler.

4. A composition of matter according to claim 3 wherein the copolymer of said latex is a copolymer of about 55% by weight of styrene, not over about 5% by weight total of methacrylic acid and itaconic acid and the balance butadiene-1,3 and the filler is calcium carbonate.

* * * * *